Patented Feb. 17, 1942

2,273,035

UNITED STATES PATENT OFFICE 2,273,035

STABILIZATION OF POLYVINYL ACETAL RESINS

Joseph B. Hale, Rochester, N. Y., assignor to Eastman Kodak Company, Rochester, N. Y., a corporation of New Jersey No Drawing. Application March 5, 1937, Serial No. 129,248

3 Claims. (Cl. 260—73)

This invention relates to the stabilization of polyvinyl acetal resins by subjecting either its polyvinyl intermediate or the resin itself to a reducing action before heat-drying the resin, after separating it from its reaction mixture.

The instability of polyvinyl acetal resins has been a problem in the art of making and using that type of resin. For instance, a product can be made therefrom and a month later the product might be dark and degraded, thus terminating its commercial usefulness. Addition of an anti-oxidant to a polyvinyl acetal resin in the preparation of products therefrom has been suggested but the unstabilized resin is very sensitive and is adversely affected by drying with heat before the antioxidant is added. Therefore, the desired purpose would not be accomplished, especially as regards its use for products such as photographic film.

Upon the hypothesis that there was some impurity present in the resin which catalyzed its disintegration, I concluded that it would be necessary to destroy this impurity before it has a chance to destructively affect the resin by converting this impurity to an ineffective form. Reducing this conclusion to practice, I tried both hydrogenating the intermediate before it was used for preparing the acetal resin and the acetal resin before it was precipitated from its reaction mixture. I found that the disintegration of the resin was prevented by either procedure. From this it appears that my hypothesis was correct. It is to be understood, however, that my invention is not limited by this theory, as the stabilization may be accomplished by some other effect when hydrogenation is applied. Possibly the instability might be due to either unstable groups or unsaturated linkages.

One object of my invention is to prepare polyvinyl acetal resins which do not exhibit a tendency to degrade upon ageing or darken when heated and which have not been detrimentally affected during their preparation. Another object of my invention is to prepare polyvinyl acetal resins which are suitable for use in making photographic film base. Further objects of my invention will appear herein.

The instability of polyvinyl acetal resins may be manifested in different ways, such as for instance by the brittleness of the resin film upon ageing.

In the laboratory the amount of stability is determined by subjecting the product to a certain temperature for a prescribed period of time. One method of determining the stability is by heating a sample of the resin to a temperature of about 180° C. in a stream of nitrogen, measuring the decomposition products formed by passing the stream of nitrogen containing those products over heated copper oxide to oxidize them to $CO_2$ and water and then collecting the $CO_2$ and weighing it. The preferred method of comparing stability is to heat a sample of the resin at about 110° C. for 24 hours and measure the loss of viscosity of a 5% solution of the resin in acetic acid. The viscosity may be determined in any customary manner, such as by the use of a viscosimeter. As the viscosities are merely for purposes of comparison, the method employed is a matter of choice for the individual operator.

I have found that by subjecting either the polyvinyl alcohol, the polyvinyl acetate before its precipitation, the polyvinyl acetate when redissolved after its precipitation, or the polyvinyl acetal resin before its drying by heat after separating it from its reaction mixture to the action of a hydrogenating agent, a resin is formed which evidences no darkening or degradation and which can be used to prepare commercial products without any darkening or degradation occurring upon ageing. Therefore, the acetal resins, which I prepare, are particularly adapted to the fine arts, such as the making of photographic film.

The hydrogenation may be carried out either by a catalytic process, electrolytic process or by the use of a reducing agent.

The catalytic hydrogenation may be carried out by treating the acetal resin or its polyvinyl intermediate in dissolved form with a catalyst which will induce hydrogenation in an atmosphere of hydrogen. The catalysts which have been found to be suitable are found among the metals of the first and eighth groups of the periodic table or the derivatives (such as the oxides) of those metals. In the case of the more active of these catalysts, care should be taken that all of the catalyst is removed after the hydrogenation has occurred as some of these, such as iron and copper, or their derivatives contribute to the instability of the resin. In the catalytic hydrogenation, the polyvinyl acetal or its polyvinyl intermediate in dissolved form is mixed with a small amount of the catalyst and the solution is subjected to the action of gaseous hydrogen for a short time, after which the catalyst is separated from the solution and the resin or the intermediate is precipitated therefrom. It must be remembered in using this method that the catalyst cannot be employed with a solvent which is incompatible therewith. For instance, if the polyvinyl acetate has been prepared in an acetic acid solvent, a catalyst will ordinarily not be employed which will be chemically affected by the acid.

The electrolytic method of hydrogenation is carried out by incorporating an electrolyte (if none is present) into the solution of the polyvinyl acetal or its intermediate and then passing a direct current therethrough until the desired hydrogenation has been accomplished. In the carrying out of the electrolysis, it is desirable to place the anode in a porous cup to prevent the oxygen or oxidation products formed from contacting the resin which is being subjected to hydrogenation.

The third method of hydrogenating the polyvinyl acetal resins or their polyvinyl intermediates is by treating a solution thereof with a reducing agent which under my theory renders the catalyzing impurity which is present innocuous. Known reducing agents, such as hydroquinone, pyrogallol or one of the reducing amines, especially of the secondary type, or a reducing agent, such as hydroxyl amine, hydrazine or the like, may be employed. If the resins are treated while still in solution in their reaction mixtures, obviously it is necessary that the reducing agent be compatible with the constituents thereof.

The non-metallic reducing agents with a few exceptions are suitable for use in my invention. Those exceptions are reducing agents which oxidize to products which promote disintegration of the resin. An example of an objectionable reducing agent is $SO_2$ which produces sulfuric acid upon oxidation.

My invention is directed to the stabilizing of polyvinyl acetal resins prepared from either polyvinyl acetate or polyvinyl alcohol although it is especialy adapted to the first type. I have found that the heat-drying after the separation of the acetal resin from its reaction mixture and washing degrades the resin and my invention contemplates hydrogenation of either the acetal resin or its polyvinyl intermediate before this stage is reached.

The acetal resin may be stabilized after its preparation while still dissolved in its reaction mixture or it may be precipitated therefrom, washed and the bulk of the water pressed therefrom by a wringing or a centrifuging operation, and then dissolved in alcohol and stabilized.

As pointed out above the polyvinyl intermediates may be stabilized while in solution either in the mixtures used in their preparation or another liquid by subjecting to a reducing action. For instance, if polyvinyl alcohol is to be heated it may be dissolved in a solvent such as acetic acid and then subjected to a reducing treatment. If polyvinyl acetate is to be treated it may be dissolved in a solvent and subjected to a reducing action. If the acetal resin is to be prepared from polyvinyl alcohol, the polyvinyl acetate which is to be employed to prepare the alcohol may be subjected to a reducing action thus resulting in an alcohol which will give a stable acetal resin.

Other polyvinyl esters than the acetate such as the propionate or butyrate or mixed or heteropolymers such as the acetate-propionate, acetate-butyrate or acetate-chloride might be employed. If desired mixtures of polyvinyl esters might be used.

The polyvinyl intermediate employed to prepare the acetal resins may be prepared by a catalytic polymerization or by a photo polymerization. In practice the catalytic polymerization has been found to be preferable. The polyvinyl esters used for preparing the acetals may be either of the fully esterified or the partially hydrolyzed type.

The acetals stabilized in accordance with my invention may be those prepared using various aldehydes such as formaldehyde, paraldehyde, propionaldehyde or butyraldehyde or mixtures of these.

Variation of the pressure and temperature conditions in stabilization processes in accordance with my invention is not important although the use of pressure will contribute to hastening the reaction. The following examples illustrate stabilization methods in accordance with my invention:

*Example I*

25 parts of polyvinyl acetate were dissolved in 75 parts of alcohol. .2 part of platinum oxide or platinum black was added and the mass was agitated in an atmosphere of hydrogen at atmospheric pressure for 2 hours. The catalyst was removed by centrifuging. A mixture of 13 parts of paraldehyde and 8 parts of concentrated hydrochloric acid was added and the mass was then allowed to stand at 40° C. for 4 days. The polyvinyl acetal, which was formed, was precipitated, washed and heat-dried. The resin was subjected to the usual stability test with the following result:

Original viscosity (c. p. s.) _____ 110
Viscosity after heating 24 hours at 110° C____ 103

A sample of polyvinyl acetate was converted to the acetal in the same manner but no hydrogenation was employed. The original viscosity of the resin was 102 but after heating 24 hours at 110° C. it had dropped to 23.

*Example II*

100 parts of polyvinyl acetate was dissolved in 500 parts of alcohol. 5 parts of concentrated hydrochloric acid was added thereto and the solution was electrolytically reduced for three hours. The apparatus employed contained a revolving silver cathode and a platinum gauze anode. The anode was placed in a porous cup so that the oxidation products were isolated from the rest of the solution. A potential of 110 volts was used which produced a current of about .2 ampere during the reduction.

After the reduction 80 parts of paraldehyde and 40 parts of concentrated hydrochloric acid were added and the mixture was allowed to stand at 40° C. for 4 days. The polyvinyl acetal resin formed was precipitated from its reaction mixture, washed with water and dried. It was found to be greatly improved in stability over an acetal resin prepared from intermediates which had not been hydrogenated.

*Example III*

A solution of 33 parts of polyvinyl acetate, such as prepared by the process of U. S. Patent No. 1,586,803, dissolved in alcohol was treated with 2 parts of hydroxylamine hydrochloride neutralized with 2 parts of potassium hydroxide. The mass was heated at 40° C. for one hour. 20 parts of paraldehyde and 10 parts of concentrated hydrochloric acid were added and the mixture was kept at 40° C. for 4 days. The product was precipitated, washed and heat-dried. Whereas, the acetal resin prepared from an untreated polyvinyl acetate dropped in viscosity from 102 to 23 upon heating that from the reduced polyvinyl acetate exhibited substantially the same viscosity after heating as before.

*Example IV*

This example illustrates the subjecting of polyvinyl acetate to a reducing action while still in solution in its reaction mixture. A mixture consisting of 50 parts of freshly distilled vinyl acetate, 30 parts of pure benzene and .05 part of benzoyl peroxide was refluxed for 4 hours on a steam bath. The product was dissolved in 200 parts of benzene and half of the solution was separated off and .2 part of platinum oxide was added thereto. This solution was agitated in the presence of hydrogen for 2 hours. The platinum was removed by centrifuging and the polyvinyl acetate was separated therefrom by precipitating in water, washing and drying. The polyvinyl acetate was then converted to polyvinyl acetal by the usual procedure resulting in a stable product.

*Example V*

This example illustrates the stabilizing of polyvinyl acetal in its reaction mixture. As time is saved, it is, of course, preferable to carry out the stabilization and the formation of the acetal simultaneously.

200 parts of polyvinyl acetate was dissolved in 500 parts of alcohol. The solution was cooled below 20° C. and 50 parts of 35% hydrochloric acid was added so that no rise in temperature occurred. 4 parts of hydroxylamine hydrochloride was then added. 50 parts each of butyraldehyde and paraldehyde was added and the mixture was allowed to stand for 2 hours. It was then placed in a bath having a temperature of 40° C. and the reaction was allowed to continue for 4 days. The polyvinyl acetaldehyde butyraldehyde resin was precipitated in cold water and washed until neutral and dried. A stable resin resulted as the original viscosity of the resin was 116 c. p. s. and after heating 24 hours at 110° C., it was 95.

It is, of course, desirable that in the use of a reducing agent both it and its oxidized form, to which it may be converted, be either water soluble or gaseous so that its removal from the solution in which it is used can be effected. It is preferable that the reducing agent used be removed from the reaction mixture in the precipitation and purification of the acetal resin, therefore, any reducing agent, which is incompatible or reacts deleteriously on the components of the acetal reaction, would not be desirable.

Some of the hydrogenation catalysts which may be employed in my process are platinum oxide, Raney nickel catalyst, platinum black, colloidal platinum, copper, reduced nickel and nickel on kieselguhr.

The polyvinyl acetal resins stabilized by my process are particularly suitable for the preparation of photographic film or any other commercial product where the transmission of light is an important factor, such as an intermediate layer in the making of laminated or "safety" glass. They may also be employed for making artificial yarn, lacquers, molding compositions, impregnated textiles or laminated products. For instance, sheets of these stabilized resins may be laminated with layers of wood, metal, paper, glass, cellulose esters, etc. These stabilized resins may be employed for electrical insulation especially where the insulated material such as wire is subjected to movement or bending. In some instances it will be found desirable to mix these resins with other plastic materials such as cellulose acetate, acetate-propionate or acetate-butyrate, cellulose ethers such as ethyl cellulose, gums, natural or synthetic resins, waxes and oils.

Partial polyvinyl acetal resins may be stabilized in accordance with my invention. For example if a polyvinyl butyraldehyde acetal resin made by condensing butyraldehyde with polyvinyl alcohol, according to French Patent No. 792,661 of Carbide and Carbon Chemicals Corporation, in which from about 2.5 to about 4 molecules of polyvinyl alcohol are combined with each molecule of butyraldehyde is dissolved in alcohol before heat-drying and subjected to a reducing action either by catalytic or electrolytic hydrogenation or by the use of a reducing agent, a stable acetal resin is formed which is especially adapted to use for preparing an intermediate layer for use in laminated glass. Instead of subjecting the acetal resin to a reducing action directly, it may be applied to the polyvinyl alcohol used or to the polyvinyl ester from which the alcohol was made.

In the testing of polyvinyl acetal resins by heating at 110° C. for 24 hours and observing the drop in viscosity in a 5% solution of the resin in acetic acid, I find that although it is preferable that there be substantially no drop in viscosity when the resin is to be employed for the base for photographic film, nevertheless the viscosity may be dropped as much as half by this heating treatment and the resin will still be satisfactory for use in the manufacture of photographic film.

The final step in the manufacture of polyvinyl acetal resins is the drying by the application of heat. The resins can only be conveniently and practically dried in large quantities by using an elevated temperature. This drying is carried out by subjecting the resin to a temperature of 65°–70° C. under conditions whereby the moisture is removed, such as by a current of dry heated air. Where the term "heat-drying" is employed herein it refers to this drying of the resin by using an elevated temperature under drying conditions. All of the resins stabilized as described in the examples were finally heat-dried to remove the moisture therefrom.

I claim:

1. The process of preparing a stable polyvinyl acetal resin which comprises condensing an aldehyde with a hydrolyzed polyvinyl ester in contact with polyhydroxybenzene in an amount between approximately 2% and approximately 6%, based on the weight of the polyvinyl ester.

2. The process of preparing a stable polyvinyl acetal resin which comprises condensing an aldehyde with a hydrolyzed polyvinyl acetate in contact with hydroquinone, the amount of which is between approximately 2% and approximately 6%, based on the weight of the polyvinyl ester.

3. The process of preparing a stable polyvinyl acetal resin which comprises condensing paraldehyde with hydrolyzed polyvinyl acetate in contact with hydroquinone in an amount between approximately 2% and approximately 6%, based on the weight of the polyvinyl ester.

JOSEPH B. HALE.